Patented May 3, 1938

2,116,423

UNITED STATES PATENT OFFICE 2,116,423

METHOD OF CRYSTALLIZATION AND CRYSTALLIZED PRODUCTS

Chester L. Baker, Berkeley, Calif., assignor to Philadelphia Quartz Company of California, Ltd., Berkeley, Calif., a corporation of California No Drawing. Application January 18, 1933, Serial No. 652,418

20 Claims. (Cl. 23—110)

The present invention relates to an improved crystallizing process which is particularly applicable to systems where the solution from which the substance is to be crystallized is of a sticky or syrupy nature and contains an alkali metal silicate. Such solutions though usually supersaturated are difficult to crystallize. My invention is especially applicable to the production of crystalline hydrates of alkali silicates, although I wish it to be understood that the principles involved might equally well be used in the production of mixtures of alkali metal silicates with other materials.

The invention also relates to certain new products or compositions of matter as will further appear.

The invention, to a large extent, has been developed in connection with the production of sodium metasilicate, and the present disclosure, therefore, will relate in large measure to such material, but, as before stated, it is not to be limited to this field.

In the prior art relating to the alkali metal silicates, where crystals, if any, have been produced, they have been contaminated with supercooled or uncrystallized liquid to an extent sufficient to result in an unstable end product which, if ground, has heretofore tended to agglomerate into a solid mass difficult to handle.

With the foregoing in mind, the primary object of the present invention may be said to reside in the provision of a crystallizing process in which the solution from which the product is to be crystallized is so thoroughly and intimately seeded, i. e., where the foci of crystallization are so greatly multiplied and distributed throughout the mass as to result in the production of an end product which is substantially free or uncontaminated with supercooled or uncrystallized material so that in granular or divided condition the product will be stable, dry and free-flowing and will not tend to agglomerate into solid masses.

The new method of promoting crystallization herein disclosed may also be used in connection with systems which contain constituents other than those which it is desired to crystallize, such as soap for example.

More specifically considered, my invention has for its object the provision of an improved process for producing stable hydrates of the alkali metal silicates, notably sodium metasilicate. In my prior applications, Serial No. 465,245, (of which the present application is a continuation in part) filed July 1, 1930, and issued as Patent No. 1,898,707 on February 21, 1933 and Serial No. 551,785, filed July 18, 1931, I have disclosed certain ways and means for producing stable hydrates of the alkali metal silicates, and the present invention, therefore, is somewhat in the nature of a modification of or improvement upon the processes therein claimed. In this particular field the primary object of the present invention is to produce the desired crystal species by means of a process in which the necessary control is exercised through regulation of the seeding operation without particular control of the temperatures involved. To state the matter in another way, I have now found that if a liquid of the approximate composition of the desired hydrate be seeded in such an intimate and thorough manner as to cause crystallization to proceed from foci much more numerous than heretofore contemplated, cakes and/or masses can be produced in which the conversion from syrupy liquid to crystalline solid is sufficiently complete to yield end products which are stable and free-flowing, even if the crystallization takes place at ordinary ambient temperatures, which temperatures, of course, are considerably under the melting temperatures of the crystal hydrates involved in the present invention. Furthermore, my invention contemplates and makes possible a marked decrease in the time required to convert the solution into crystal form.

A statement of the more detailed objects of my invention, therefore, may be said to involve (1) the provision of a method for the production of crystalline materials by means of which it is unnecessary to give any particular consideration to the control of the temperatures involved so long as the particular compound sought does not melt or decompose; (2) the provision of a method in which the conversion from syrupy liquid to a crystalline solid is more complete than with previous processes known to the art; (3) the provision of a method in which the foci of crystallization are enormously multiplied so as to bring all portions of the liquid into intimate contact with a focus of crystallization; (4) the provision of a method which results in an end product of flaked character which will remain dry, stable and free-flowing in storage; (5) the provision of a method which will result in considerable saving not only in the cost of manufacture but also in the amount of time necessary to arrive at the desired end product; (6) the provision of a method in which the transition from liquid to solid form takes place in a much shorter interval of time than has been possible heretofore, which feature, of course, lends itself particularly well to the development of a continuous manufacturing process; (7) the provision of a method of the foregoing character whereby mixtures of crystallized materials may be prepared, which mixtures are also stable and substantially free of any tendency to agglomerate; and (8) the production of certain new compositions of matter in stable form. Other objects and advantages will appear hereinafter or occur to those skilled in the art.

Various examples of the manner in whch my improved method can be carried out are as follows:

I.—Method of producing $Na_2SiO_3.5H_2O$

To 5000 grams of a solution of sodium silicate containing 8.84% $Na_2O$ and 28.8% $SiO_2$ are added 1378 grams of caustic soda containing 76% $Na_2O$. The solution is then evaporated until the total weight is reduced from 6378 grams to 5090 grams. This hot liquor should test just under 63° Bé. This solution is allowed to cool to any convenient temperature below 70° C. It is then placed on a roll type ink grinding mill and 500 grams of powdered $Na_2SiO_3.5H_2O$ crystals added. The mass is then ground on the two primary rolls of the mill for about one minute. The discharge roll is then moved into place and the entire mass discharged onto the knife of the machine. The product will be white in color and quite opaque. Immediately upon cooling it will become hard and brittle, so that it may be ground into a dry, free-flowing powder. In case the evaporated liquid has been cooled to room temperature, the mass may be discharged from the mill in the form of a very heavy paste which solidifies almost immediately.

II.—Method of producing $Na_2SiO_3.6H_2O$

To 4525 grams of a solution of silicate of soda containing 8.84% $Na_2O$ and 28.8% $SiO_2$ is added 1245 grams of caustic soda containing 76% $Na_2O$. The solution thus formed is evaporated until the total weight is reduced from 5770 grams to 5000 grams. The liquid is then allowed to cool to any convenient temperature below 62° C. and placed on the two primary rolls of an ink grinding mill. 500 grams of crystalline $Na_2SiO_3.6H_2O$ are then added and the mixture ground for one minute. The third roll of the mill is then moved into place and the mass discharged onto the knife of the machine. Upon cooling the mass will become hard and brittle so that it may be ground to a dry, free-flowing, granular powder consisting of crystalline $Na_2SiO_3.6H_2O$.

III.—Method of producing $Na_2SiO_3.9H_2O$

To 4500 grams of a solution of silicate of soda containing 8.84% $Na_2O$ and 28.8% $SiO_2$ is added 1240 grams of caustic soda containing 76% $Na_2O$, and 410 grams of water. The solution is brought to a boil and the small amount of water lost by evaporation replaced, so that the final solution has a weight of 6150 grams. This liquid is cooled to any convenient temperature below 47° C. The mass is then ground for about 1 minute. The third roll of the mill is then moved into place and the entire mass discharged onto the knife of the machine. The discharged mass will be white and creamy in consistency. Upon cooling it will become hard and brittle so that it can be ground to a dry, free-flowing, granular powder consisting of crystalline $Na_2SiO_3.9H_2O$.

The foregoing examples relate to certain of the sodium metasilicates, but it should be understood that the principles of the invention are applicable to the production of other alkali metal silicates in stable crystalline form, as well as to mixtures of these with other materials, such, for example, as sodium sesqui-silicate, sodium metaborate ($NaBO_2.4H_2O$) etc.

By way of example sodium sesqui-silicate can be produced in the following manner:—

IV.—Method of producing $Na_3HSiO_4.5H_2O$

To 3300 grams of a solution of silicate of soda containing 8.84% $Na_2O$ and 28.8% $SiO_2$ is added 909 grams of caustic soda containing 76% $Na_2O$ and the solution thus formed evaporated to a weight of 3360 grams. This solution should then test just under 63° Bé. This solution is then cooled to a temperature of 70° C. or below and 640 grams of caustic soda containing 76% $Na_2O$ dissolved in it. The solution thus formed is allowed to cool to any convenient temperature below 78° C. and if necessary 500 grams of crystalline $Na_3HSiO_4.5H_2O$ mixed in. The mass is then placed on the two primary rolls of an ink grinding roll mill and ground for one minute. The third roll of the mill is then moved into place and the mass discharged onto the knife of the machine. The discharged mass will be white and opaque in color and will almost immediately harden into a brittle mass capable of being ground to a dry free-flowing stable granular powder. More often, however, the mass will be discharged from the machine as thin white flakes which immediately harden and can be used in the arts without further grinding.

In the foregoing example the seeding by the addition of the 500 grams of crystalline $Na_3HSiO_4.5H_2O$ may not be necessary because experience has shown that after a period of cooling a number of crystals may sometimes form spontaneously and these can be satisfactorily dispersed by the grinding operation or its equivalent.

My improved process gives rise to an additional and very important advantage in that it makes possible a state of more intimate relationship between crystals prepared from solutions which crystallize with difficulty and other substances which modify and/or increase their usefulness.

For example, a mixture of sodium carbonate and the pentahydrate of sodium metasilicate may be made in which the two substances are present, the sodium metasilicate as a crystalline product while the sodium carbonate appears as an amorphous solid, although undoubtedly being finely crystalline. But the two crystals are so intimately interlocked that they appear to the eye or even under a low-power microscope as a homogeneous mass. The same is also true of mixtures of crystalline alkali metal silicates and soap and of salt mixtures where two crystal species are formed concurrently, such as the phosphate silicate mixtures, the silicate metaborate mixtures and the mixtures of the different hydrates of sodium sesquisilicate with the hydrates of sodium hydroxide. This intimate relationship prevents the possibility of mechanical segregation of the mixed substances and thus of one of them acting in any sense independent of the modifying effect of the other. Caustic soda, for example, is an extremely corrosive substance, but in such mixtures as here contemplated its corrosive effect is modified by the presence of the silicate compound and it is much safer to use. Some of the silicate compounds are too actively alkaline for certain uses, as in contact with sensitive fabrics or human skin, and the presence of hydrates of sodium metaborate thus intimately related exerts a modifying effect quite beyond expectation in view of the properties of the materials separately.

Insofar as mixtures are concerned, the following examples may be taken as typical methods of procedure:—

V.—Method of preparing a mixture of $Na_3PO_4.12H_2O$ and $Na_2SiO_3.9H_2O$

To 4500 grams of a solution of silicate of soda containing 8.84% $Na_2O$ and 28.8% $SiO_2$ is added 1240 grams of caustic soda containing 76% $Na_2O$ and 410 grams of water. The solution is brought to a boil and the small amount of water lost by evaporation replaced so that the final solution has a weight of 6150 grams. This liquid is cooled to any convenient temperature below 47° C. To the liquid is then added 1000 grams of crystalline trisodium phosphate ($Na_3PO_4.12H_2O$) and 500 grams of crystalline $Na_2SiO_3.9H_2O$. The mixture is then placed on the two primary rolls of an ink grinding roll mill and ground for one minute. The third roll is then moved into place and the mass discharged onto the knife of the machine. The discharged material will be white and opaque in color and usually in the form of thin white flakes which become hard and brittle almost immediately. At times the discharged mass will come off as a heavy paste which will harden almost immediately and can be ground to dry free-flowing, non-caking stable granular powder.

This ground product is in the form of granules of interlocking crystals of $Na_3PO_4.12H_2O$ and $Na_2SiO_3.9H_2O$, said crystals being interlocked during growth, being substantially free from supercooled metastable liquid and being substantially incapable of mechanical segregation, the composition as a whole being at least 90 per cent crystallized and having substantially no tendency to agglomerate into solid masses.

VI.—Method of preparing a mixture of $Na_2CO_3$ and $Na_2SiO_3.5H_2O$

To 5000 grams of a solution of sodium silicate containing 8.84% $Na_2O$ and 28.8% $SiO_2$ are added 1378 grams of caustic soda containing 76% $Na_2O$. The solution is then evaporated until the total weight is reduced to 5090 grams. 2000 grams of commercial sodium carbonate are then mixed in and the mixture allowed to cool to any convenient temperature below 70° C. 500 grams of $$Na_2SiO_3.5H_2O$$

crystals are then added and the mixture ground on the two primary rolls of an ink grinding roll mill for about one minute. The third roll is then moved into place and the material discharged as a heavy, white, opaque paste which solidifies upon cooling, to a hard brittle mass which can be easily ground to dry free-flowing granular stable powder. The sodium carbonate remains unchanged during the above procedure and it occurs in the product in its original state, usually considered amorphous, but known to be finely crystalline. The ground product therefore consists of granules of interlocking crystals of $Na_2CO_3$ and $$Na_2SiO_3.5H_2O$$

in a dry, stable, non-caking free-flowing state, said crystals being interlocked during growth, being substantially free from supercooled metastable liquid and being substantially incapable of mechanical segregation, and the $Na_2SiO_3.5H_2O$ in the product being at least 90 per cent crystallized.

VII.—Method of preparing a mixture of soap and $Na_2SiO_3.5H_2O$

To 5000 grams of a solution of sodium silicate containing 8.84% $Na_2O$ and 28.8% $SiO_2$ are added 1378 grams of caustic soda containing 76% $Na_2O$. The solution is then evaporated until the total weight is reduced to 5090 grams. The solution is then allowed to cool to any convenient temperature below 70° C. and 500 grams of granulated soap, together with 500 grams of $Na_2SiO_3.5H_2O$, added. The mixture is then ground on the two primary rolls of an ink grinding roll mill for one minute. The third roll is then moved into place and the mass discharged as a heavy paste. This mass will harden upon cooling so that it may be ground into a dry free-flowing granular and stable powder.

VIII.—Method of preparing a mixture of $Na_2SiO_3.9H_2O$ and $NaBO_2.4H_2O$

To 2250 grams of a solution of silicate of soda containing 28.82% $SiO_2$ and 8.84% $Na_2O$ are added 620 grams of caustic soda containing 76% $Na_2O$ and 630 grams of water. The solution formed is just brought to a boil and any water lost by evaporation replaced. The solution is then cooled to any convenient temperature below 55° C. At a temperature above 55° C.

$$NaBO_2.4H_2O$$

transforms into $NaBO_2.2H_2O$ and since the former compound is desired, it is necessary to maintain the temperature below 55° C. To the solution is then added 1850 grams of borax $$(Na_2B_4O_7.10H_2O)$$

and 390 grams caustic soda containing 76% $Na_2O$. This addition is brought into solution by stirring, care being taken to prevent the temperature rising above 55° C. The mass is then placed upon the two primary rolls of an ink grinding roll mill and 100 grams of $Na_2SiO_3.9H_2O$ and 100 grams of $NaBO_2.4H_2O$ added for seed. The mixture is ground for about one minute and then discharged from the machine as a white, opaque material which solidifies almost immediately to a hard brittle product which when ground will remain dry, free-flowing and stable upon storage. The product will consist of a definite mixture of $$NaBO_2.4H_2O$$

and $Na_2SiO_3.9H_2O$.

IX.—Method of preparing a mixture of crystalline $NaOH.H_2O$ and $Na_3HSiO_4.2H_2O$ 1450 grams of caustic soda containing 76% $Na_2O$ are dissolved in 5250 grams of a solution of silicate of soda containing 28.84% $SiO_2$ and 8.84% $Na_2O$.

The solution thus formed is evaporated to a weight of 5476 grams and is then cooled to any convenient temperature below 30° C. 4555 grams of caustic soda containing 76% of $Na_2O$ are then added and the mixture ground for one minute on the two primary rolls of an ink grinding roll mill. The third roll is then brought into position and the mass discharged from the machine as a thick white opaque paste which hardens within a short period of time into a brittle mass which can be easily ground to a granular, free-flowing, stable powder.

Many other mixtures can be made in a similar way providing proper consideration be given to equilibrium characteristics. For example, combinations of penta or monohydrates of sodium sesquisilicate with hydrates of sodium hydroxide may be made.

It should also be noted that certain combinations of the hydrates may be produced as stable mixtures, and by way of example I desire to cite the following:—

X.—Method of producing a mixture of $Na_2SiO_3.5H_2O$ and $Na_2SiO_3.6H_2O$

To 5000 grams of a solution of sodium silicate containing 8.84% $Na_2O$ and 28.8% $SiO_2$ are added 1378 grams of caustic soda containing 76% $Na_2O$. The solution is then evaporated until the total weight has been reduced to 5310 grams. This solution is then allowed to cool to any convenient temperature below 53° C. 250 grams of crystalline $Na_2SiO_3.5H_2O$ together with 25 grams of crystalline $Na_2SiO_3.6H_2O$ are then stirred in. The mixture is then ground on the two primary rolls of an ink grinding roll mill for about one minute. The third roll is then moved into place and the mass discharged onto the knife of the machine. The mass will be white and opaque in color and will solidify immediately upon cooling.

In all of the foregoing examples it will be noted that I have described the use of a roll type ink grinding mill for the purpose of grinding the seeded solution. I wish it to be distinctly understood, however, that it is not essential to the spirit and scope of the invention that a machine of this type is necessary, as other grinding or subdividing machines such as paint mills, colloid mills or disintegrators may very well be employed for accomplishing the same purpose. In fact other expedients may be adopted, within the scope of this invention, for causing the necessarily thorough and intimate subdivision and distribution of the seed. The factor which is important is to greatly multiply the foci of crystallization by comminuting or subdividing the seed, as by the grinding operation described.

Insofar as my present knowledge is concerned, it would seem that the action involved is a distribution of the seed, together with sufficient multiplication of the foci of crystallization of such nature as will serve to bring substantially all portions of the liquid into intimate contact with a focus of crystallization, and this in a reasonably short space of time. The grinding employed in my invention operates to break up, subdivide or comminute the seed and/or the crystals as they are formed so that the whole mass crystallizes into the desired hydrate in such a way as to substantially preclude, in the end product, the presence of supercooled or uncrystallized mother liquor.

The uniform dispersal or distribution of the crystals or crystal fragments may be likened to the distribution of a pigment in a vehicle to form paint. In any event the distribution should be extremely thorough and the number of nuclei should be multiplied to a very great extent in order to obtain the best results.

I have discovered that the desired result can be brought about by adding seed crystals of the desired hydrate to the uncrystallized solution at room temperature and grinding and dispersing this seed in the solution on an ink grinding roll mill or other grinding device.

Where a roll type grinding mill is employed, such as the ink grinding mill mentioned in the examples, it is possible to produce an end product of flaky character very similar to corn flakes such as are commonly used as a breakfast cereal, except, of course, that these flakes are white. This flaked product or any ground or comminuted form into which the crystallized mass may be converted by suitable mechanical means will remain dry, stable and free-flowing in storage.

One way in which to determine the degree of transition into crystal form which may result when practicing the foregoing process is to resort to the heat of solution test. It is a fact well known to physical chemists that soluble substances, when dissolved in water, either give off or absorb heat, and the quantity of heat thus involved is referred to as "heat of solution" and is expressed in calories per gram molecule. Thus, for example, when one gram molecule of $MgSO_4.7H_2O$ is dissolved in 400 gram molecules of water, the system will absorb 3800 gram calories. On the other hand, one gram molecule of $MgSO_4.H_2O$ will give off 13,300 gram calories and one gram molecule of $MgSO_4$ will give off 20,280 gram calories.

A similar relationship exists between the heats of solution for the various hydrates of the alkali metal silicates, and with particular reference to sodium metasilicate, the values indicated in the following table have been obtained by dissolving, on the one hand, 10 grams of the crystallized material in 150 grams of water, and on the other hand, 10 grams of the uncrystallized supercooled liquid in 150 grams of water.

*Temperature change when 10 grams of material are dissolved in 150 grams of water*

|  | Crystals |  | Liquid |  |
| --- | --- | --- | --- | --- |
| $Na_2SiO_3.9H_2O$ | −3.48 | ±0.02 | −0.55 | ±0.02 |
| $Na_2SiO_3.8H_2O$ | −3.10 | ±0.02 | −0.53 | ±0.02 |
| $Na_2SiO_3.6H_2O$ | −2.25 | ±0.02 | −0.15 | ±0.02 |
| $Na_2SiO_3.5H_2O$ | −1.85 | ±0.02 | +0.14 | ±0.02 |

If one examines the table above he will notice that in the case of $Na_2SiO_3.9H_2O$ the uncrystallized solution lowers the temperature by 0.55° C., whereas the crystallized material lowers the temperature by 3.48° C. A similar relationship exists in the case of each material. It will thus be seen that if a mixture of crystals and uncrystallized solution of the same chemical composition are used in this experiment a value will be obtained which is less than that given by the uncontaminated crystals. From the values thus obtained it is possible to make a rough calculation of the amount of crystalline material in the sample taken. For example: Should the sample taken give a temperature lowering of 2.95, the amount of the crystallized material can be expressed as $$\frac{(2.95-.55)100}{3.48-.55}=81.8\%$$

In the several examples given above heats of solution tests of the character just described indicated that the degree of crystallization was upwards of 90% in every instance and generally ranged between 93.5% and 95%.

I also wish to point out that in connection with all of the foregoing examples involving the specific grinding operation described, considerable latitude is permissible in the grinding time. For example, I have conducted a series of tests in which the grinding time was varied from 10 seconds to 5 minutes and the heat of solution test showed that crystallization was substantially the same throughout the entire range. The criterion, therefore, is the nature of the end product. Intimacy of seed distribution should be sufficient to ensure a conversion into crystalline form which will result in a dry, stable, free-flowing end product and, as indicated above, I prefer to operate in a range which will yield a product which is crystallized substantially 90% or more.

It will be seen, therefore, that I have provided a method for producing crystalline hydrates of the alkali metal silicates and compositions containing the same in which it is unnecessary to give any particular consideration to the temperature at which crystallization takes place. The stability and character of the end product are determined by suitable control of the seeding step as herein described. The extremely thorough and intimate manner of seeding the solution which I have described will yield an end product characterized by substantially complete transformation into crystal form. Furthermore, my improved process may be used to produce the various alkali metal silicate crystal hydrates in substantially pure form, i. e., uncontaminated with other hydrates. In other words, the end product may be characterized by the predominance of a single hydrate, which fact, in cooperation with the substantially complete crystallization which takes place, is largely responsible for the dry, stable, free-flowing qualities which are so vital to a satisfactory practical and commercial article.

From the foregoing examples it will also be seen that the transition from liquid to crystal form takes place in a much shorter interval of time than has been possible heretofore. This fact lends itself particularly well to application of the invention to continuous manufacturing processes, the economic advantages of which are very material.

I should also like to point out that when the crystals have been comminuted, thus establishing the rapid rate of transition, the mass may be allowed to solidify as a film which will produce an end product in the form of flakes, or it may be mechanically atomized to yield a powder directly without grinding or it may be extruded through suitable apertures to yield vermicular particles. In short, the process may be adapted to produce a finished product in any one of a great variety of physical shapes adapted to commercial requirements and all of which are characterized by the properties of free-flowing and stability. This has not heretofore been possible and results in another advantage, i. e., with my process the finished article can be produced in particles of predetermined shape and size.

In practice the advantages of the invention may be realized even in instances where other materials may be added for the purpose of modifying the behavior of the crystals sought. By way of example, for detergent or other purposes, materials such as starch, rosin, mineral or vegetable oils, colloidal silicates and/or other agents may be introduced where desired to modify the behavior of the crystal species without departing from the spirit and scope of the present invention.

I claim:—

1. In the production of sodium metasilicate pentahydrate, the method which includes preparing a solution of the approximate composition of the said hydrate, cooling the solution to any convenient temperature below the melting point of the said hydrate, initiating crystallization, finely grinding the resulting mixture of crystals and solution while simultaneously dispersing the crystals rapidly and uniformly throughout said mixture while said mixture is still in a liquid condition in such manner as to produce a resulting crystallized product substantially free from supercooled liquid and capable of being comminuted to a dry, stable, free-flowing powder.

2. The method of claim 1 wherein crystallization is initiated by seeding with a quantity of sodium metasilicate pentahydrate crystals.

3. In the production of a composition of matter containing a crystalline hydrate of an alkali metal silicate, the method which includes preparation of a solution which corresponds substantially to the composition desired, cooling the solution to any convenient temperature below the melting point of the crystalline hydrate, initiating crystallization thereof, finely grinding the resulting mixture of crystals and solution while simultaneously dispersing the crystals rapidly and uniformly throughout said mixture while said mixture is still in a liquid condition in such manner as to produce a resulting crystallized product substantially free from supercooled liquid and capable of being comminuted to a dry, stable, free-flowing powder.

4. The method of claim 3 wherein crystallization is initiated by seeding with a quantity of the crystalline hydrate desired.

5. The method of making crystalline hydrates of alkali metal silicates which includes preparing a solution substantially corresponding to the composition of a predetermined hydrate, cooling the solution to any convenient temperature below the melting point of the said hydrate, initiating crystallization, finely grinding the resulting mixture of crystals and solution while simultaneously dispersing the crystals rapidly and uniformly throughout said mixture while said mixture is still in a liquid condition in such manner as to produce a resulting crystallized product substantially free from supercooled liquid and capable of being comminuted to a dry, stable, free-flowing powder.

6. The method of claim 5 wherein crystallization is initiated by seeding with a quantity of the hydrate desired.

7. The method of making a definite hydrate of sodium metasilicate which includes preparing a solution approximately corresponding to the composition of the desired hydrate, initiating crystallization, finely grinding the resulting mixture of crystals and solution while simultaneously dispersing the crystals rapidly and uniformly throughout said mixture while said mixture is still in a liquid condition in such manner as to produce a resulting crystallized product substantially free from supercooled liquid and capable of being comminuted to a dry, stable, free-flowing powder.

8. The method of claim 7 wherein crystallization is initiated by seeding with a quantity of the desired hydrate.

9. The method of making a definite hydrate of sodium metasilicate which includes preparing a solution approximately corresponding to the composition of the desired hydrate, cooling the solution to any convenient temperature below the melting point of the said hydrate, initiating crystallization, finely grinding the resulting mixture of crystals and solution while simultaneously dispersing the crystals rapidly and uniformly throughout said mixture while said mixture is still in a liquid condition in such manner as to produce a resulting crystallized product substantially free from supercooled liquid and capable of being comminuted to a dry, stable, free-flowing powder.

10. The method of claim 9 wherein crystallization is initiated by seeding with a quantity of the desired hydrate.

11. The method of making a definite hydrate of sodium metasilicate which includes preparing a solution approximately corresponding to the composition of the desired hydrate, initiating crystallization and grinding the mass to subdivide the crystals in such manner as to distribute foci of crystallization so intimately and rapidly as to result in a dispersal of the order of the distribution of a pigment in a vehicle to form paint, whereby the resulting product is at least 90 per cent crystallized.

12. The method of claim 11 wherein crystallization is initiated by seeding with a quantity of the desired hydrate.

13. The method of preparing a mixture of crystalline trisodium phosphate and crystalline sodium metasilicate which consists in preparing a liquid mixture calculated to satisfy the water requirements in the proportions of the two materials as desired in the finished product, cooling the solution to any convenient temperature below the melting point of the crystalline sodium metasilicate, initiating crystallization, finely grinding the resulting mixture of crystals and solution while simultaneously dispersing the crystals rapidly and uniformly throughout said mixture while said mixture is still in a liquid condition in such manner as to produce a resulting crystallized product substantially free from supercooled liquid and capable of being comminuted to a dry, stable, free-flowing powder.

14. The method of claim 13 wherein crystallization is initiated by seeding with a mixture of crystalline trisodium phosphate and crystalline sodium metasilicate.

15. The method of preparing a mixture of sodium carbonate and sodium metasilicate pentahydrate which consists in preparing a solution of sodium metasilicate pentahydrate, adding sodium carbonate in the desired proportion, initiating crystallization, finely grinding the resulting mixture of crystals and solution while simultaneously dispersing the crystals rapidly and uniformly throughout said mixture while said mixture is still in a liquid condition in such manner as to produce a resulting crystallized product substantially free from supercooled liquid and capable of being comminuted to a dry, stable, free-flowing powder.

16. The method of claim 15 wherein crystallization is initiated by seeding with crystals of sodium metasilicate pentahydrate.

17. In the production of crystalline compositions of matter containing a crystalline hydrate of an alkali metal silicate and another compatible alkali metal compound, the process which comprises preparing a liquid mixture having a composition substantially corresponding to that of the desired finished product, cooling the liquid mixture to a point below the melting point of the desired crystalline alkali metal silicate, initiating crystallization, finely grinding the mixture of crystals and solution while simultaneously dispersing the crystals rapidly and uniformly throughout the liquid mixture while said mixture is still in a liquid condition in such manner as to produce a resulting crystallized product substantially free from supercooled liquid and capable of being comminuted to a dry, non-caking, free-flowing powder.

18. The method of claim 17 wherein crystallization is initiated by the introduction of seed crystals into the liquid mixture.

19. As a new composition of matter, granules of interlocking crystals of an alkali metal silicate hydrate and sodium carbonate in a dry non-caking, free-flowing state, said crystals being substantially free from supercooled metastable liquid and being substantially incapable of mechanical segregation, the alkali metal silicate in said composition being at least 90 per cent crystallized and having substantially no tendency to agglomerate into solid masses.

20. As a new composition of matter, granules of interlocking crystals of an alkali metal silicate hydrate and $Na_3PO_4.12H_2O$ in a dry, non-caking, free-flowing state, said crystals being substantially free from supercooled metastable liquid and being substantially incapable of mechanical segregation, the composition as a whole being at least 90 per cent crystallized and having substantially no tendency to agglomerate into solid masses.

CHESTER L. BAKER.